(12) United States Patent
Aoyama

(10) Patent No.: US 6,286,044 B1
(45) Date of Patent: Sep. 4, 2001

(54) NETWORK-CONNECTED DEVICE MANAGEMENT SYSTEM

(75) Inventor: Koji Aoyama, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/175,726

(22) Filed: Oct. 20, 1998

(30) Foreign Application Priority Data

Jun. 23, 1998 (JP) ................................................ 10-176369

(51) Int. Cl.[7] ........................................................ G06F 13/00
(52) U.S. Cl. ............................................ 709/223; 455/456
(58) Field of Search ...................................... 709/223–226, 709/249; 445/266, 442, 456, 439; 342/457, 387; 379/211; 340/825; 370/52; 455/455; 714/39

(56) References Cited

U.S. PATENT DOCUMENTS

| | | | |
|---|---|---|---|
| 5,297,190 | * | 3/1994 | Ito ........................................ 455/455 |
| 5,327,144 | * | 7/1994 | Stilp et al. ............................ 342/387 |
| 5,512,908 | * | 4/1996 | Herrick ................................. 342/387 |
| 6,018,573 | * | 1/2000 | Tanaka ................................. 379/211 |
| 6,026,304 | * | 2/2000 | Hilsenrath et al. ................... 455/456 |
| 6,031,490 | * | 2/2000 | Forssen et al. ...................... 342/457 |
| 6,035,197 | * | 3/2000 | Haberman et al. .................. 455/439 |
| 6,038,450 | * | 3/2000 | Brink et al. .......................... 455/442 |
| 6,047,171 | * | 4/2000 | Khayrallah et al. ................. 455/266 |

FOREIGN PATENT DOCUMENTS

| | | |
|---|---|---|
| 60-180227 | 9/1985 | (JP) . |
| 8-205234 | 9/1996 | (JP) . |

* cited by examiner

*Primary Examiner*—David A Wiley
(74) *Attorney, Agent, or Firm*—Sughrue, Mion, Zinn, Macpeak & Seas, PLLC

(57) ABSTRACT

A managing apparatus constructs a database for each network-connected apparatus. Each network-connected apparatus receives ID electric waves transmitted from at least three PHS base stations located at different places, and transmits the amplitudes of the received electric waves and IDs to the managing apparatus. The managing apparatus computes the positions of each network-connected apparatus based on the IDs and amplitudes of the electric waves received from each network-connected apparatus and position of the PHS base stations, and stored the position of each network-connected apparatus in the database.

15 Claims, 14 Drawing Sheets

NETWORK-CONNECTED DEVICE MANAGEMENT SYSTEM

FIELD OF THE INVENTION

The present invention relates to a network managing method, a network management facility, and a network-connected apparatus for collecting and managing information from an apparatus (or apparatuses) connected through a cable or a radio system to a network.

BACKGROUND OF THE INVENTION

In recent years, advantages of connecting a computer or a data processor to a network have been widely recognized, and the number and types of apparatuses connected to a network (described as network-connected apparatuses hereinafter) are increasing. In association with this tendency, network structure is becoming increasingly complicated, and now there is the need for management of network-connected apparatuses.

As a tool for management of information of network-connected apparatuses, there has been known an apparatus which collects device names or information for connection in a network in the online mode and provide the collected information to, for instance, a network manager. By using a tool of this type, a user can collect and manage network information without going to a place where the network-connected apparatuses are located. Also with a tool of this type, it is possible to collect information for network connection and provide, for instance, a tree-formed layered-display of the information for network connection on a display screen of a network managing apparatus, so that the user can edit the information to a state similar to an actual layout with a graphic tool by maintaining the network connection state as it is.

As a unit for collecting information for a position where an object at a remote site is present, there is known a system that uses the GPS (Global Positioning System) or the PHS (Personal Handy-Phone System). GPS is a system which receives electric waves transmitted from a plurality of communication satellites and determines the position of an object, namely a car or a ship moving with a receiver for GPS installed thereon from the delay time of each received electric waves. A system making use of the PHS receives electric waves transmitted from a plurality of base stations using a PHS terminal (a simple portable telephone terminal) and detects the position of the PHS terminal as a mobile station according to amplitude of the received signals.

The network information management tool based on the conventional technology as described above can detect a change in position, when the logical network connection structure namely the structure indicating only connection between network-connected apparatuses and not indicating actual location of the network-connected apparatuses is changed, but can not detect a change in the position, when actual location of the network-connected apparatuses are physically changed while maintaining the logical network connection structure as it is. Namely, with the conventional tools as described above, information on physical position of each network-connected apparatus is not collected as one type of network information from each apparatus, so that physical movement of network-connected apparatus is known only to a person who has actually moved the network-connected apparatus.

In a case of network management in a small organization in which all of network-connected apparatuses are completely put under control by a network manager, the network manager will know a change in the physical position of each network-connected apparatus and reflect the information to the management information. However, as a scale of a network becomes larger, it becomes difficult to accurately and immediately manage physical movement of all network-connected apparatuses. The reason is that, even if it is tried to divide a large-scale network into several small-scale networks, a time delay may be generated between actual movement of a network-connected apparatus and updating of the movement information or a destination of movement of the network-connected apparatus may be erroneously inputted so far as the network management is manually executed.

Also when the network structure is displayed as a tree-formed layered structure on a display screen, or when a user uses a graphic tool to edit or have layout information displayed with the network connection state unchanged, a time delay may be generated in updating the positional information or a user may input erroneous information.

SUMMARY OF THE INVENTION

It is an object of the present invention to provide a network management method for constructing a database containing positional information of a device connected to the network via a cable or a radio system by detecting positional information of the device and also managing configuration information of the network by making use of the database.

It is another object of the present invention to provide a network management facility which can construct a database containing positional information of a device connected to the network and by detecting positional information of the device and manage the configuration information of the network by making use of the database.

It is another object of the present invention to provide an apparatus, which can be connected to a network and transmits information concerning its position through the network to a managing apparatus.

With the present invention, there is provided a method in which, a managing apparatus constructs a database for each network-connected apparatus, and after construction of the database, each network-connected apparatus receives electric waves from at least three radio base stations provided at different places and transmits amplitudes of the received electric waves to the managing apparatus, while the managing apparatus computes the positions of each of the network-connected apparatus based on the amplitudes of electric waves received from each network-connected apparatus and the position of the radio base stations transmitting the electric waves and stores the position of the network-connected apparatus in the database.

With the present invention, there is provided a method in which, a managing apparatus constructs a database for each network-connected apparatus, and after construction of the database, each network-connected apparatus receives electric waves transmitted from at least four different communication satellites and transmits the received data to the managing apparatus, while the managing apparatus computes the position of each network-connected apparatus based on the received data from each network-connected apparatus, and stores the position of the network-connected apparatus in the database.

With the present invention there is provided a method in which, a managing apparatus constructs a database for each network-connected apparatus. After construction of the database, a mobile station is placed near the network-connected apparatus, and the mobile station receives electric waves from at least three radio base stations provided at different places from each other and transmits amplitudes of the received electric waves via a communication unit to the network-connected apparatus. The network-connected apparatus receives amplitudes of electric waves transmitted from the mobile station and transmits amplitudes of the received electric waves to the managing apparatus, while the managing apparatus computes positions of each of the network-connected apparatuses based on the amplitude of the electric waves transmitted from the network-connected apparatuses and the position of the radio base stations transmitting the electric waves and stores the position of the network-connected apparatus in the database.

With the invention above, there is provided a method in which, a managing apparatus constructs a database for each network-constructed apparatus. After construction of the database, a portable terminal is placed near the network-connected apparatus, and the portable terminal receives electric waves from at least four different communication satellites and also transmits the received data via a communication unit to the network-connected apparatus. The network-connected apparatus receives the data from a portable terminal and transmit the data to the managing apparatus, while the managing apparatus computes positions of the network-connected apparatuses based on the data transmitted by the network-connected apparatuses and stores the position of the network-connected apparatus in the database.

With the present invention, there is provided a network managing facility in which, each network-connected apparatuses receive electric waves transmitted from at least three radio base stations and transmits amplitudes of the received electric waves to the managing apparatus, while the managing apparatus constructs a data base for each network-connected apparatus and computes positions of the network-connected apparatuses based on the amplitudes of electric waves transmitted from the network-connected apparatuses and positions of the radio base stations transmitting the electric waves and stores the position of the network-connected apparatus in a database.

With the present invention, there is provided a network managing facility in which, each network-connected apparatuses receive electric waves transmitted from at least four communications satellites and transmits the received data to the managing apparatus, while the managing apparatus constructs a database for each network-connected apparatuses, computes the position of each network-connected apparatus based on the received data transmitted from each network-connected apparatus, and stores the position of the network-connected apparatus in a database.

With the present invention, there is provided a network managing facility in which, a mobile station placed near a network-connected apparatus receives electric waves transmitted from at least three radio base stations and transmits the amplitude of each received electric wave via a communication unit to the network-connected apparatus, while the network-connected apparatus receives the amplitude of each received electric wave transmitted from the mobile station and transmits the amplitude of the received electric wave to the managing apparatus, while the managing apparatus constructs a database for each network-connected apparatus, computes the position of each network-connected apparatus based on amplitude of each electric wave transmitted from each network-connected apparatus and the position of the radio base stations transmitting the electric waves, and stores the position of the network-connected apparatus in the database.

With the present invention, there is provided a network managing facility in which, a portable terminal located at a position near the network-connected apparatus and receives electric waves transmitted from at least four communication satellites transmits the received data via a communication unit to the network-connected apparatus, while the network-connected apparatus transmits the data received from the portable terminal to the managing apparatus, and the managing apparatus constructs a database for each network-connected apparatus, computes the position of each network-connected apparatus according to the data received from each network-connected apparatus and stores the position of the network-connected apparatus in the database.

With the present invention, there is provided a network-connected apparatus in which, electric waves transmitted from at least three radio base stations are received, and amplitudes of received electric waves are transmitted to a managing apparatus connected thereto through a network, so that the managing apparatus can identify the position of the network-connected apparatus based on the amplitude of received electric waves and position of the radio base stations transmitting the electric waves.

With the present invention, there is provided a network-connected apparatus in which, electric waves transmitted from at least four communication satellites are received and the received data is transmitted to a managing apparatus connected thereto through a network, so that the managing apparatus can identify position of the network-connected apparatus from the received data.

Other objects and features of this invention will become clear from the following description with reference to the accompanying drawings.

DESCRIPTION OF THE PREFERRED EMBODIMENTS

Detailed description is made for embodiments of a network managing method, a network management facility, and a network-connected apparatus each according to the present invention with reference to the related drawings.

Figure 1:
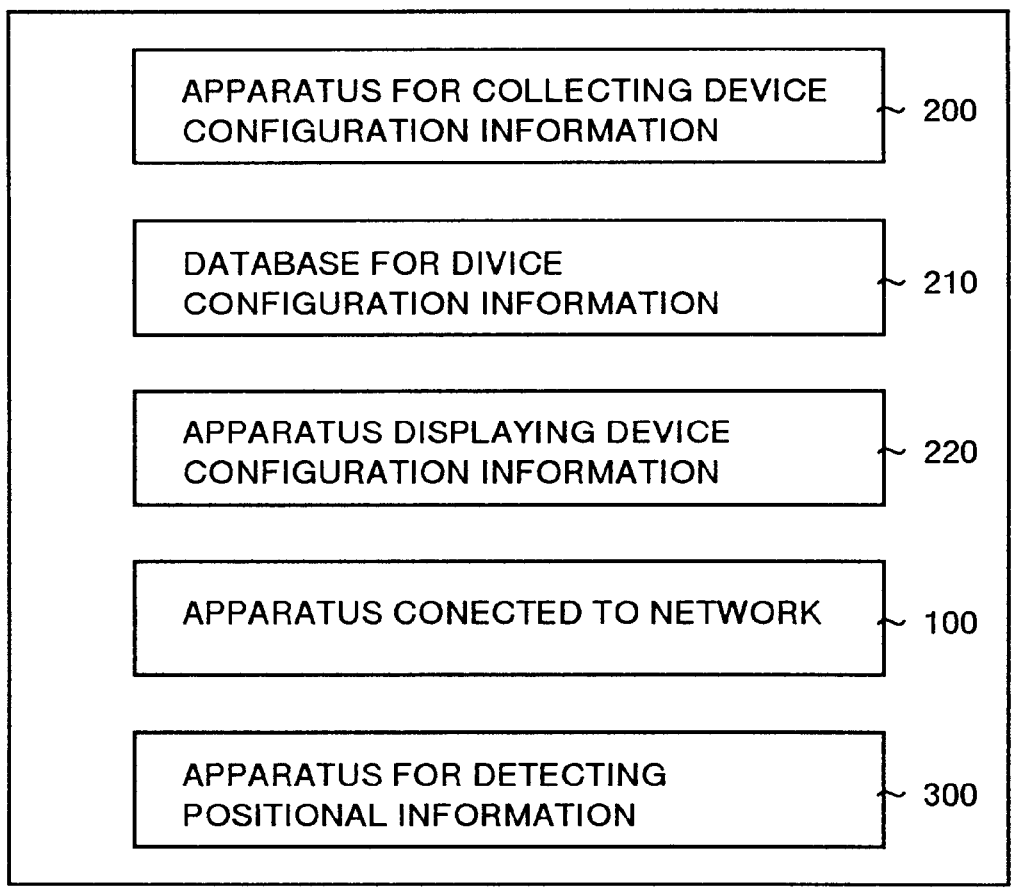
FIG. 1 is a simulated view showing an example of configuration according to the present invention.

FIG. 1 shows principles of configuration of the present invention. The present invention relates to a network managing system comprising an apparatus 200 for collecting device configuration information of a network comprising an arbitrary number of apparatuses 100 each connected to the network, a database 210 with the device configuration information stored therein, an apparatus 220 for displaying the device configuration information, and an apparatus 300 for detecting information relating to physical position of the apparatus 100 connected to the network. Herein the network can be constructed with cables or with a radio system.

In this system, the apparatus 300 detects a position of the apparatus 100, sends the detected positional information together with device information such as a unitary name of the network, a device name, machine type name, and an operating state, stores the information or updates positional information in the database 210 according to the information.

Figure 2:
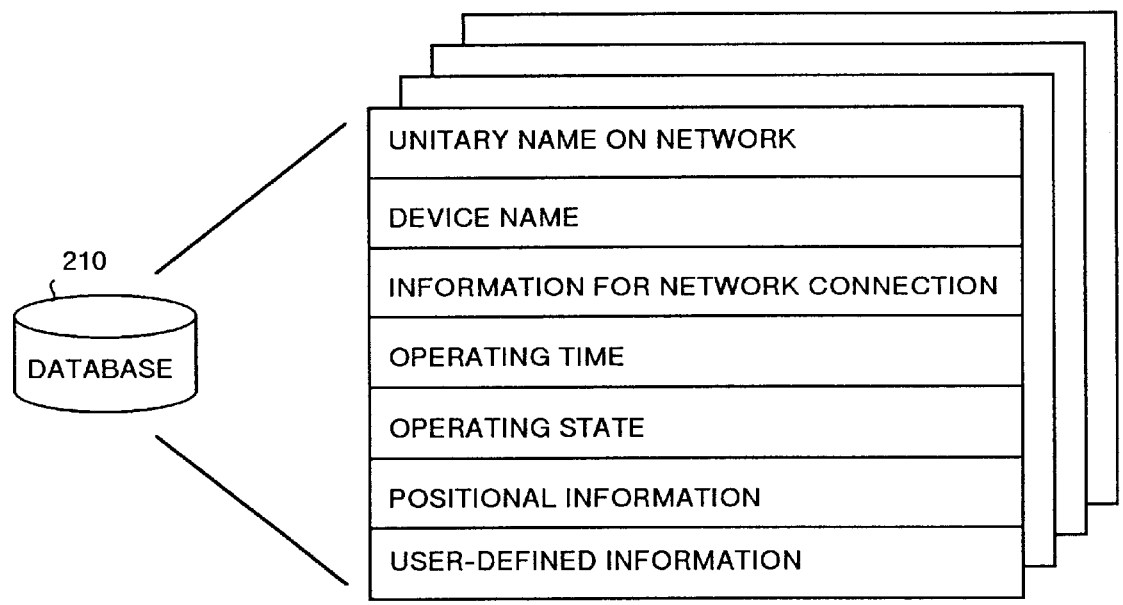
FIG. 2 is a simulated view showing an example of records in a database constructed according to the present invention.

FIG. 2 shows an example of records in the database 210. A record comprises fields of, for instance, "unitary name of the network", "device name", "information for network connection", "operating time", "operating state", "positional information" and "user-defined information".

Figure 3:
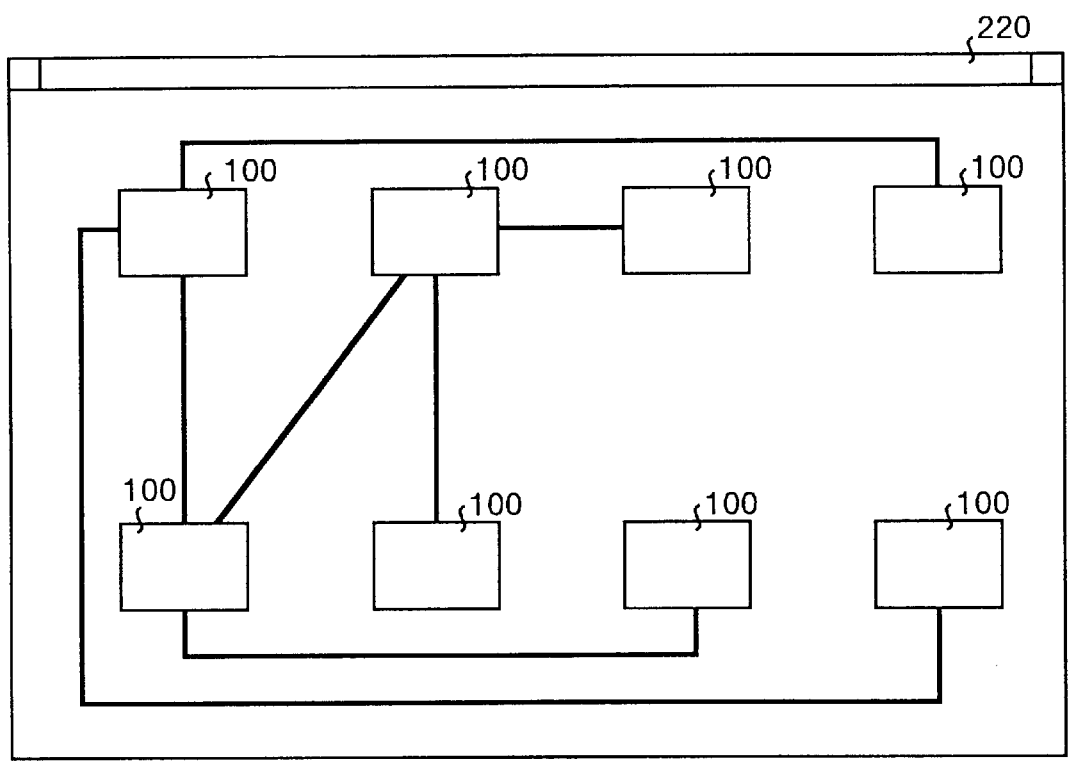
FIG. 3 is a simulated view showing an example of display of network connection in the present invention.

This system fetches device configuration information from the database 210 in response to a demand from a user as a network manager, and displays the device configuration information in a display unit 220. FIG. 3 shows an example of display of the device configuration information. In this example of display, a plurality of devices 100 connected to a network are laid out at prespecified positions based on the positional information of each device, so that mutual connection between the devices can be understood visually.

Figure 4:
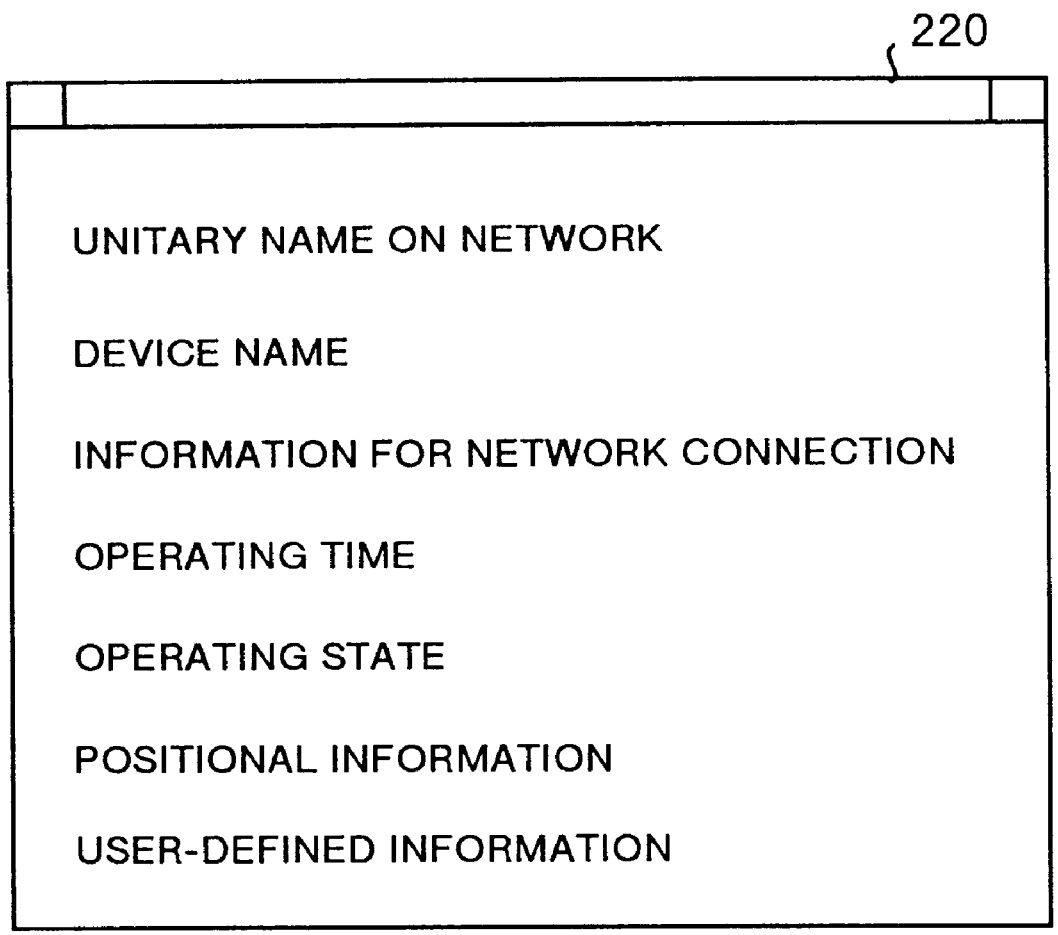
FIG. 4 is a simulated view showing an example of display of device information in the present invention.

In this system, when a user selects any device 100 with a selecting unit such as, for instance, a mouse while the screen shown in FIG. 3 is being displayed, an instruction for detailed information on the selected device 100 is transmitted to an apparatus 200 for collecting device configuration information. Then information for the corresponding apparatus is read from the database 210, and as shown in FIG. 4, information for "unitary name on the network", "device name", "information for network connection", "operating time", "operating state", "positional information" and "user-defined information" is displayed on the screen. When any change occurs in the device configuration information, this system reports the change to the user.

Figure 5:
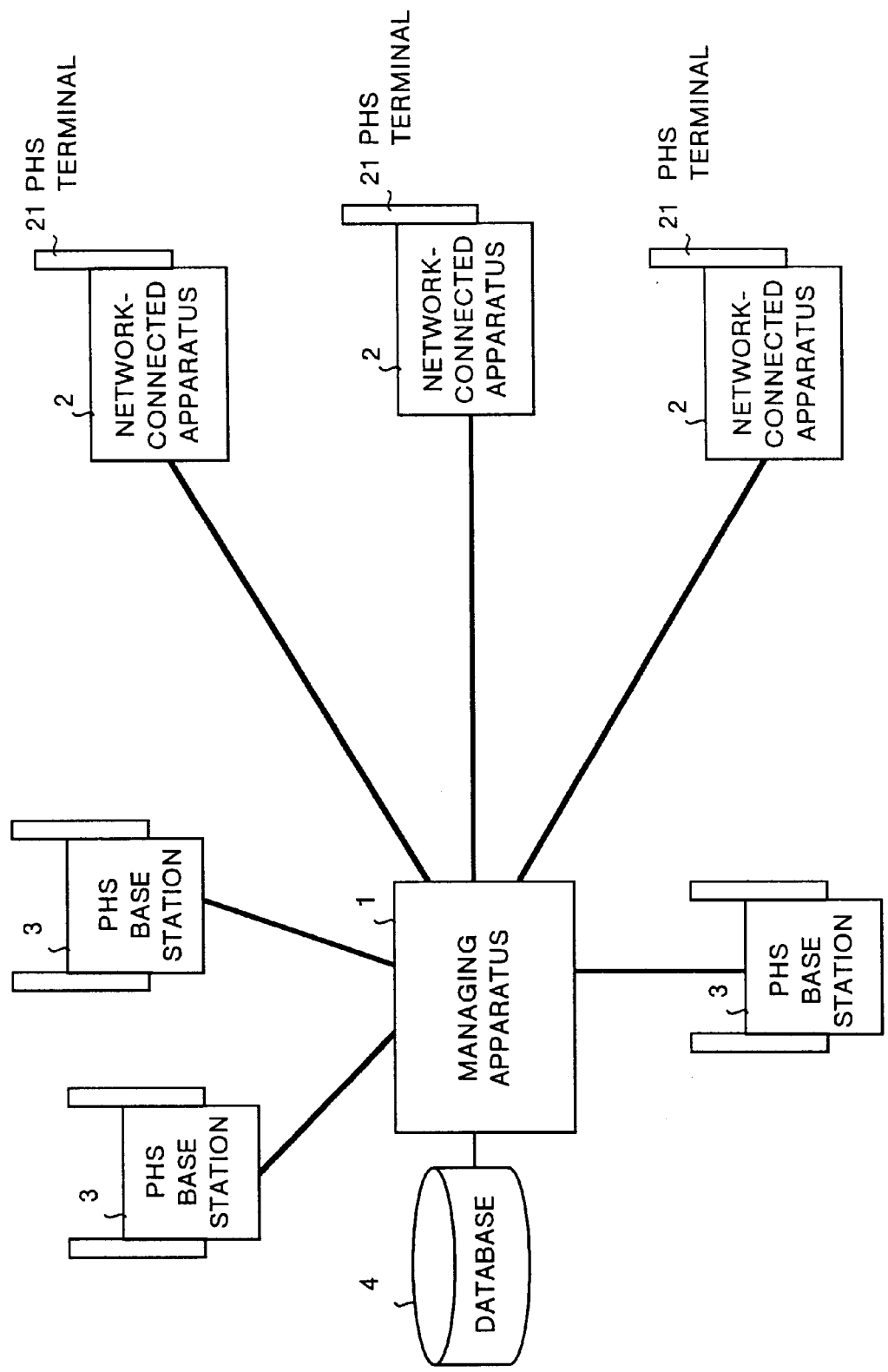
FIG. 5 is a block diagram showing Embodiment 1 of the present invention.

FIG. 5 is a block diagram showing a network management facility according to Embodiment 1 of the present invention. This network management facility has a managing apparatus 1, an arbitrary number of network-connected apparatuses 2 (though 3 units are shown in the figure the number is not limited), and at least three PHS base stations each as a radio base station provided at different yet known places. The managing apparatus 1 and the network-connected apparatus 2 correspond to the apparatus 200 for collecting device configuration information and the apparatus 100 respectively connected to the network in FIG. 1.

The network-connected apparatus 2 has a PHS terminal 21 as a receiving unit for receiving electric wave transmitted from the PHS base station 3. The network-connected apparatus 2 receives, with a PHS terminal 21, electric waves transmitted from the at least three PHS base stations 3 and transmits the amplitude of the received electric wave to the managing apparatus 1. If a PHS system has been introduced as a local communication network, the asset may be utilized.

Herein amplitude of each electric wave is a function of a distance from each PHS base station 3 transmitting the electric wave. For this reason, by receiving electric waves transmitted from at least three PHS base stations located at different places from each other and computing an amplitude of each received electric wave, the position of the network-connected apparatus 2 can be identified. For this reason, the PHS terminal 21 and the PHS base station 3 has a function corresponding to the apparatus 300 for detecting positional information shown in FIG. 1.

The managing apparatus 1 computes the position of the network-connected apparatus 2 based on the amplitude of at least three electric waves transmitted from the network-connected apparatus 2 and the position of the PHS base stations 3 transmitting the electric waves.

The managing apparatus 1 constructs a database 4 (corresponding to the device configuration information database 210 in FIG. 1) for each network-connected apparatus 2. This database 4 is stored in a storage device such as a built-in or built-out hard disk provided with the managing apparatus 1.

The managing apparatus 1 has a display unit comprising a CRT or a liquid-crystal display not shown herein (corresponding to the apparatus 220 for displaying the device configuration information in FIG. 1). Displayed on the display unit are layout and mutual connections of a plurality of network-connected apparatuses 2 connected to the network (Refer to FIG. 3). Also displayed on the display unit is detailed information for a particular network-connected apparatus 2 (Refer to FIG. 4). The managing apparatus 1 may be connected to a display unit such as a monitor or a printing device such as a printer as an external device.

Figure 6:
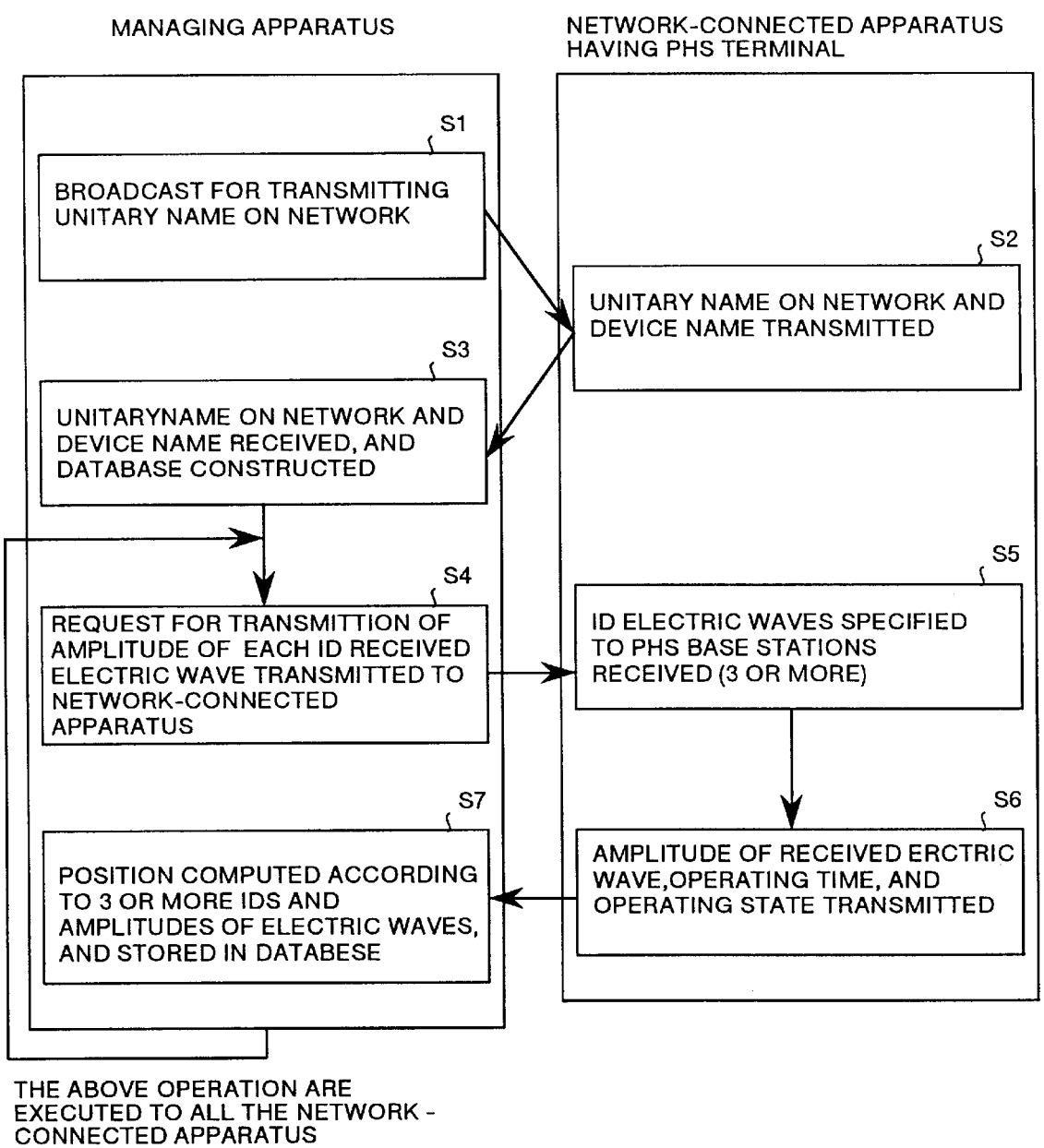
FIG. 6 is a flow chart showing the processing in Embodiment 1.

Description is made for actions of the network management facility having the configuration as shown in FIG. 5 with reference to FIG. 6. In the network managing method according to the present invention, operations thereof are executed in two stages. In the first stage, each of the network-connected apparatuses 2 connected to the network is recognized and the database 4 for each network-connected apparatus is constructed, and in the second stage positional information for each network-connected apparatus is detected and the information is collected together with data such as an operating time of each network-connected apparatus 2.

First stage

The managing apparatus 1 transmits a request for transmission of information such as a unitary name on the network or a device name to each of the network-connected apparatuses 2 by using the broadcast function of the network (step S1).

Each network-connected apparatuses 2 receives the request, and transmits such information as the name on the network or a device name thereof to the managing apparatus 1 (step S2).

The managing apparatus 1 having received the information from each network-connected apparatus 2 constructs the database 4 for the network from the received information (step S3).

Second stage

In the PHS system, the PHS base station 3 is always transmitting electric wave including an ID (identifier) information specific to the PHS base station 3 to inform the PHS terminal 2 of its existence. The managing apparatus 1 refers to the database 4 constructed in the first stage and transmits a request demanding transmission of the amplitude of the received ID electric wave to each of the network-connected apparatuses 2 in an arbitrary order (step S4). Only one positional information is processed at one time. Namely, positional information for each network-connected apparatuses 2 is collected one by one.

The network-connected apparatus 2 having received a request for transmission of amplitude of the received ID electric wave receives ID electric waves from at least three different PHS base stations 3 (step S5), and transmits the amplitude of each received electric wave together with IDs of the PHS base station and such a data as the device name, an operating time and an operating state of the apparatus to the managing apparatus 1 (step S6).

As described above, an amplitude of electric wave is a function of a distance, so that the managing apparatus 1 computes positions of the three PHS base stations 3 based on the IDs as well as amplitudes of received electric waves and determines the position of the network-connected apparatus 2 by computing a distance from each of the PHS base stations 3. It is assumed herein that positional information for the PHS base station 3 corresponding to each ID is already stored in a memory or other storage device of the managing apparatus 1. The managing apparatus 1 stores the positional information for the network-connected apparatus 2 together with such data as the received device name, an operating time and an operating state of the apparatus in a field for a corresponding database record in the database 4 (step S7). Above operations are repeatedly executed for all the network-connected apparatuses 2.

Figure 7:
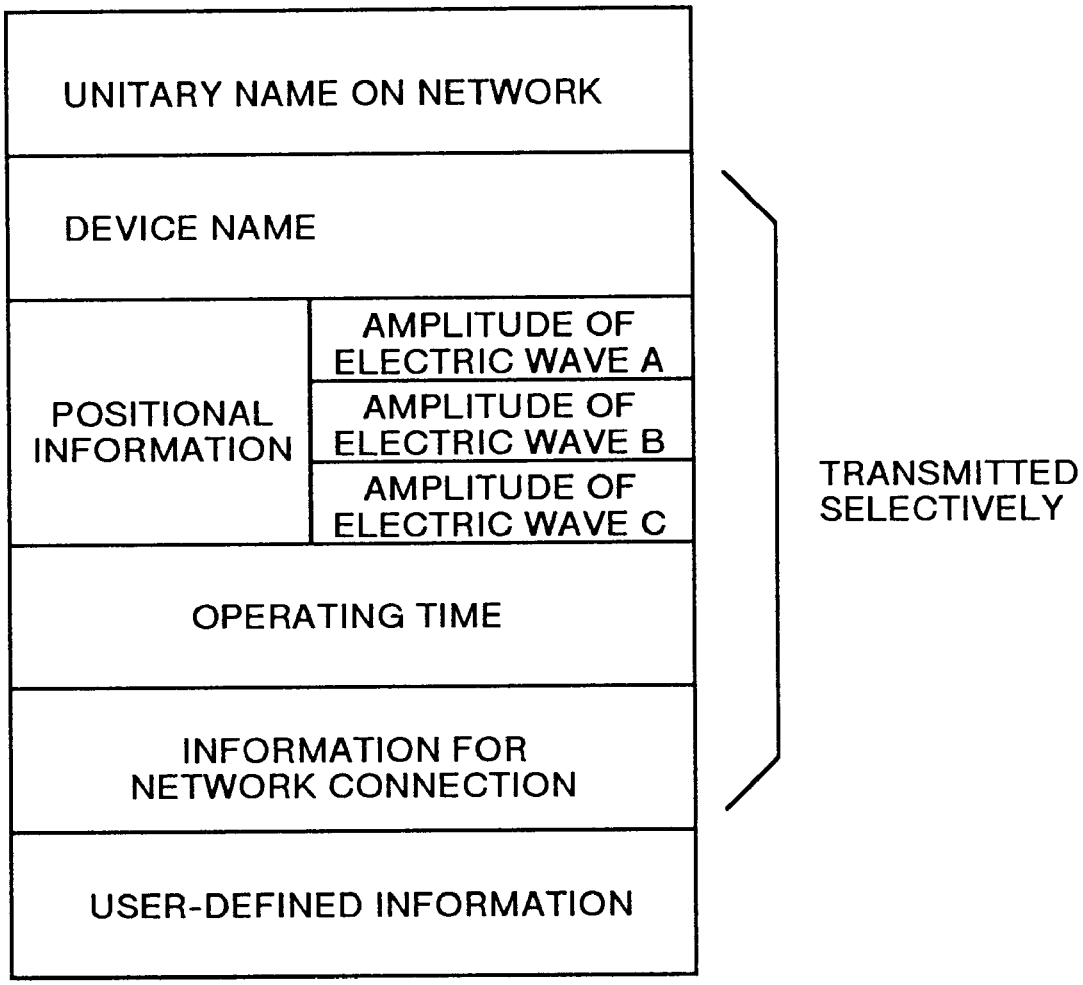
FIG. 7 is a simulated view showing an example of a packet flowing on a network according to Embodiment 1 or 3 of the present invention.

FIG. 7 shows an example of data structure transacted through a network. The data includes, for instance, "unitary name on the network", "device name", "positional information" obtained from the amplitudes of three received electric waves A, B, C, "operating time", "information for network connection" and "user-defined information". In this data structure, arbitrary data can be stored in areas other than those for the "unitary name on the network" and "positional information".

The managing apparatus 1 repeatedly executes the above-described operations in the second stage at a specified cycle. In doing so, the network-connected apparatus 2 may transmit in the second transmission and on only data in which a change has occurred in any of the "device name", "positional information", "information for network connection", "operating time", "operating state" and "user-defined information" in the data structure shown in FIG. 7.

With Embodiment 1 of the present invention as described above, the managing apparatus 1 constructs the database 4 for each network-connected apparatus 2, and after construction of the database 2, each network-connected apparatus 2 receives ID electric waves transmitted from at least three PHS base stations located at three different places, and transmits the IDs and amplitudes of the received electric waves to the managing apparatus 1, while the managing apparatus 1 computes the position of each network-connected apparatus 2 based on the ID and amplitude of each received electric waves transmitted from each network-connected apparatus 2 the positional information for the PHS base stations 3 transmitting the electric waves and stores the positional information in the database 4. Thus, even when the network-connected apparatus 2 is moved, information for destination of movement of the network-connected apparatus 2 is automatically reflected to the database 4 without requiring any manual operation and information for movement of the network-connected apparatus 2 is accurately and rapidly updated in the database 4. For this reason, it is possible to correctly manage the information regarding configuration of the network by using the database 4.

Also with Embodiment 1, when any trouble is generated on the network, it is possible to accurately know the present position and actual position of the network-connected apparatus 2 in the network in which the trouble has occurred, so that the time required to restoring normal operations of the network can be reduced.

Further with Embodiment 1, data transaction is executed at a specified cycle between the managing apparatus 1 and the network-connected apparatus 2, so that, when the network-connected apparatuses 2 are portable device connected to the network via a radio system, a position of each portable device can be found out at a specified time interval, which advantageously makes it possible to know a place where an owner of each portable device is currently present.

With Embodiment 1 described above, each network-connected apparatus 2 has the PHS terminal 21, so that each network-connected apparatus 2 can inform the network manager of any emergency by making use of the PHS terminal 21.

With Embodiment 1, as the PHS base terminals 3 are used, if a PHS system has been introduced as an extension of a private communication network, the existing PHS base terminals can be utilized, and when a new PHS base station 3 is introduced, the PHS base station 3 can advantageously be used as an extension line.

It should be noted that this system for identifying the position of each network-connected apparatus 2 is not limited to the PHS system and any other system may be used so long as a receiving site, namely a position of the network-connected apparatus can be identified based on the amplitudes of received electric waves transmitted from at least three radio base stations.

Figure 8:
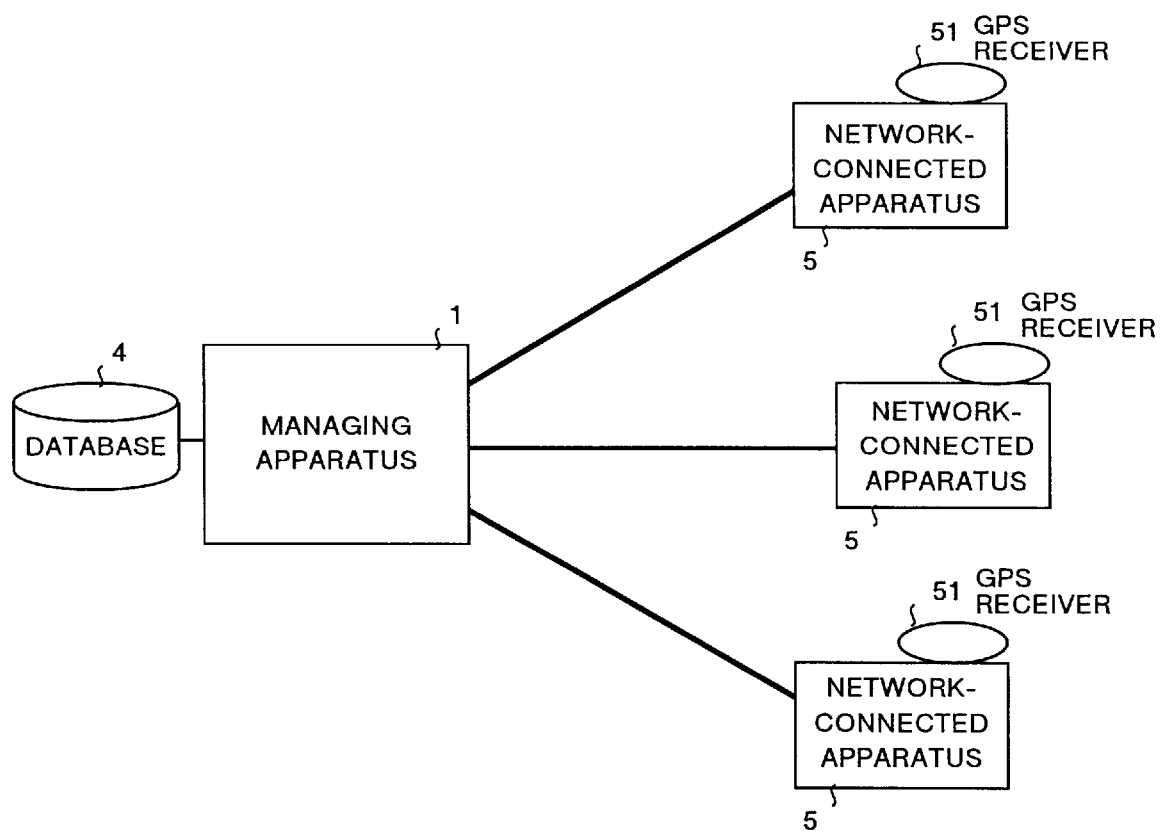
FIG. 8 is a block diagram showing Embodiment 2 of the present invention.

FIG. 8 is a block diagram showing a network management facility according to Embodiment 2 of the present invention. Difference between this network management facility and the one of Embodiment 1 of the present invention is that the position of an apparatus connected to a network is identified by using the GPS system instead of the PHS system. For this reason, in this case the PHS base stations are not required. Namely the facility shown in FIG. 8 comprises a managing apparatus 1, and an arbitrary number of network-connected apparatuses 5 (only 3 units are shown in the figure), and each of the network-connected apparatus 5 has a GPS receiver 51 in place of a PHS terminal. The network-connected apparatus 5 corresponds to the apparatus 100 connected to the network shown in FIG. 1. Same reference numerals are assigned to the same components as those in Embodiment 1 and detailed description thereof is omitted.

The network-connected apparatus 5 receives electric wave through the GPS receiver 51 for measurement of location transmitted from a communication satellite not shown herein, and transmits the received data to the managing apparatus 1. Herein the GPS receiver 51 has a function corresponding to the apparatus 300 for detecting positional information shown in FIG. 1, but as the GPS system is well known to those skilled in the art, description of the principle enabling identification of a receiving site is omitted herein.

The managing apparatus 1 computes the position of the network-connected apparatus 5 based on the data received from the network-connected apparatus 5 for electric waves for location measurement transmitted from at least four communication satellites.

Figure 9:
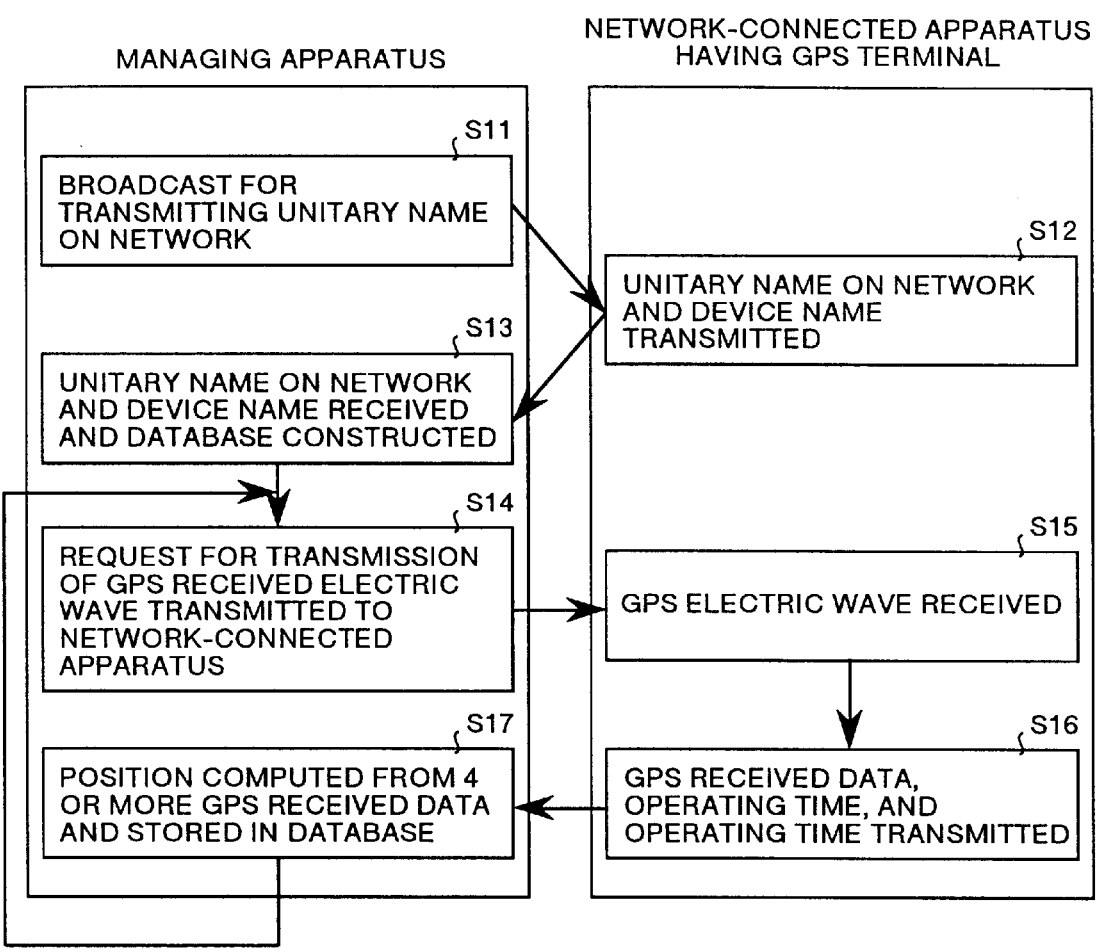
FIG. 9 is a flow chart showing the processing in Embodiment 2.

Description is made for actions of the network management facility having the configuration as shown in FIG. 8 with reference to FIG. 9. The network managing method according to the present invention is divided into a first stage in which each network-connected apparatus 5 connected to a network is recognized and the database for each network-connected apparatus is constructed, and a second stage in which positional information for each network-connected apparatus 5 is detected and the information is collected together with such data as an operating time of each network-connected apparatus 5.

First stage

The managing apparatus 1 transmits a request for transmission of a unitary name on the network and a device name of each network-connected apparatus to all the network-connected apparatuses 5 connected to the network by using the broadcast function of the network (step S11).

Each network-connected apparatus 5 receives the request and transmits such data as a name on the network and a device name thereof to the managing apparatus 1 (step S12).

The managing apparatus 1 having received the information from each network-connected apparatus 5 constructs the database 4 for the network from the received information (step S13).

Second stage

In the GPS system, electric wave including four types of data; namely latitude, a longitude, an altitude of each communication satellite and time of transmission of electric wave therefrom is continuously transmitted. The managing apparatus 1 transmits a request for transmission of received data for GPS electric wave to the network-connection apparatuses 5 in an arbitrary order (step S14). Only one positional information is processed at one time. Namely, positional information for each network-connected apparatuses 5 is collected one by one.

The network-connected apparatus 5 having received a request for transmission of received GPS data receives GPS electric waves transmitted from at least four different communication satellites (step S15), and transmits the data together with such data as a device name, an operating time, and an operating state of each network-connected apparatus 5 to the managing apparatus 1 (step S16).

The managing apparatus 1 identifies the position of the network-connected apparatus 5 by computing a receiving site for the GPS electric waves, namely a latitude, a longitude, and altitude of the network-connected apparatus 5 based on the received data for GPS electric waves from four or more communication satellites. The managing apparatus 1 stores the positional information for the network-connected apparatus 5 together with such data as a name of the receiving device, an operating time and an operating state of the device in a filed for corresponding database record in the database 4 (step 4). Above operations are repeatedly executed for all the network-connected apparatuses 5.

Figure 10:
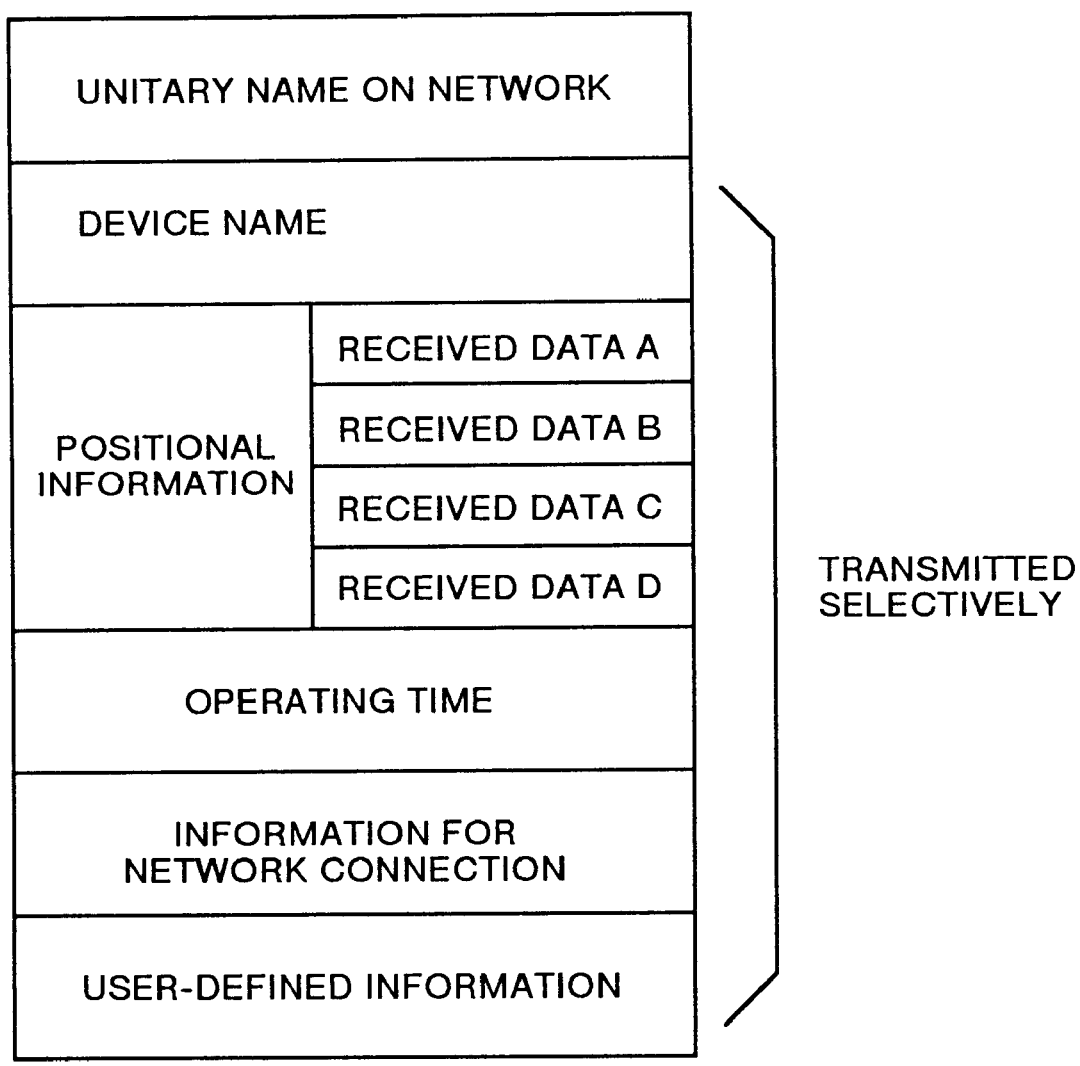
FIG. 10 is a simulated view showing an example of a packet flowing on a network according to Embodiment 2 or 4 of the present invention.

FIG. 10 shows an example of structure of data transacted over the network. The data consists of, for instance, "unitary name on the network", "device name", "positional information" comprising 4 types of received data A, B, C, D, "operating time", "information for network connection", and "user-defined information". In this data structure, arbitrary data can be stored to areas other than those for the "unitary name on the network" and "positional information".

The managing apparatus 1 repeatedly executes the operations in the second stage as described above at a specified cycle. In doing so, in the second transmission and on, of the data structure shown in FIG. 10, only data in which a charge has occurred in any of the "device name", "positional information", "information for network connection", "operating time", "operating state" and "user-defined information" may be transmitted.

With Embodiment 2 described above, the managing apparatus constructs a database 4 for each network-connected apparatus 5, and each network-connected apparatus 5 receives GPS electric waves transmitted from at least four communication satellites located at different places respectively, and transmits the received data to the managing apparatus 1, while the managing apparatus 1 computes the position of each network-connected apparatus 5 based on the received data for GPS electric waves transmitted from each network-connected apparatus 5, and stores the positional information in the database 4, so that, even if the network-connected apparatus 5 is moved, information for destination of the movement is automatically reflected to the database 4 without requiring any manual labor by an operator, and the database 4 is quickly updated to respond to movement of the network-connected apparatus 5. For this reason, information for the network configuration can correctly be managed by using the database 4.

Also with Embodiment 2, when any trouble is generated on a network, it is possible to accurately know the present position and the actual position of the network-connected apparatus 5 in the network in which trouble has occurred, so that the time required to restore normal operations of the network can be reduced.

Further with Embodiment 2, data transaction is executed at a specified cycle between the managing apparatus 1 and each network-connected apparatus 5, and when the network-connected apparatuses 5 are portable devices connected via a radio system to the network, a position of each portable device can be found out at a specified time interval, which advantageously makes it possible to know the current position of the owner of each portable device.

Figure 11:
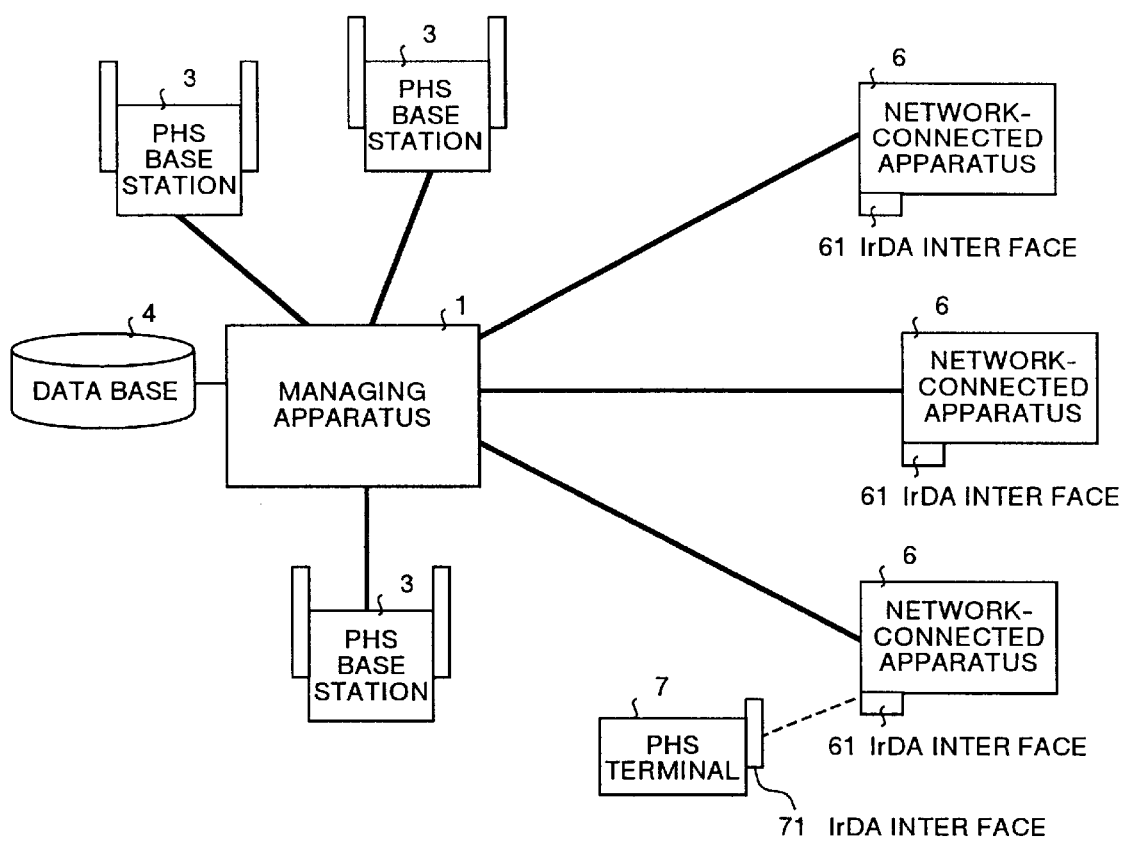
FIG. 11 is a block diagram showing Embodiment 3 of the present invention.

FIG. 11 is a block diagram showing the network management facility according to Embodiment 3 of the present invention. Difference between this network management facility and the one of Embodiment 1 shown in FIG. 5 is that each network-connected apparatus 6 connected to the network has an IrDA communication interface 61 as a communication unit making use, for instance, of infrared rays in place of a PHS terminal, and also the PHS terminal as a mobile station has an IrDA communication interface 71, and that data transaction between the PHS terminal 7 and each network-connected apparatus 6 is executed via the IrDA communication interfaces 71, 61 and a position of each network-connected apparatus 6 is identified by using the PHS terminal 7. The network-connected apparatus 7 corresponds to the apparatus 100 connected to the network in FIG. 1. Same reference numerals are assigned to the same components as those in Embodiment 1 and detailed description thereof is omitted.

The PHS terminal 7 receives electric waves transmitted from at least three PHS base stations 3, stores an amplitude of each received electric wave and an ID of each PHS base station 3, and transmit the data via the IrDA communication interfaces 71, 61 to the network-connected apparatuses 6. If a PHS system has been introduced as a private communication network, the resources may be utilized.

In the PHS system, as described in relation to Embodiment 1 of the present invention, a position of the PHS terminal can be identified by receiving electric waves transmitted from at least three different PHS base terminals and computing amplitude of each received electric waves. For this reason, when the PHS terminal 7 is located near the network-connected apparatuses 6, a position of each network-connected apparatuses 6 can be identified by detecting a position of the PHS terminal, so that the PHS terminal 7 and the PHS base stations 3 has a function corresponding to the apparatus 300 for detecting positional information shown in FIG. 1.

The network-connected apparatus 6 transmits amplitude of each received ID electric wave transmitted from the PHS terminal 7 and an ID of each PHS base station 3 to the managing apparatus 1.

Figure 12:
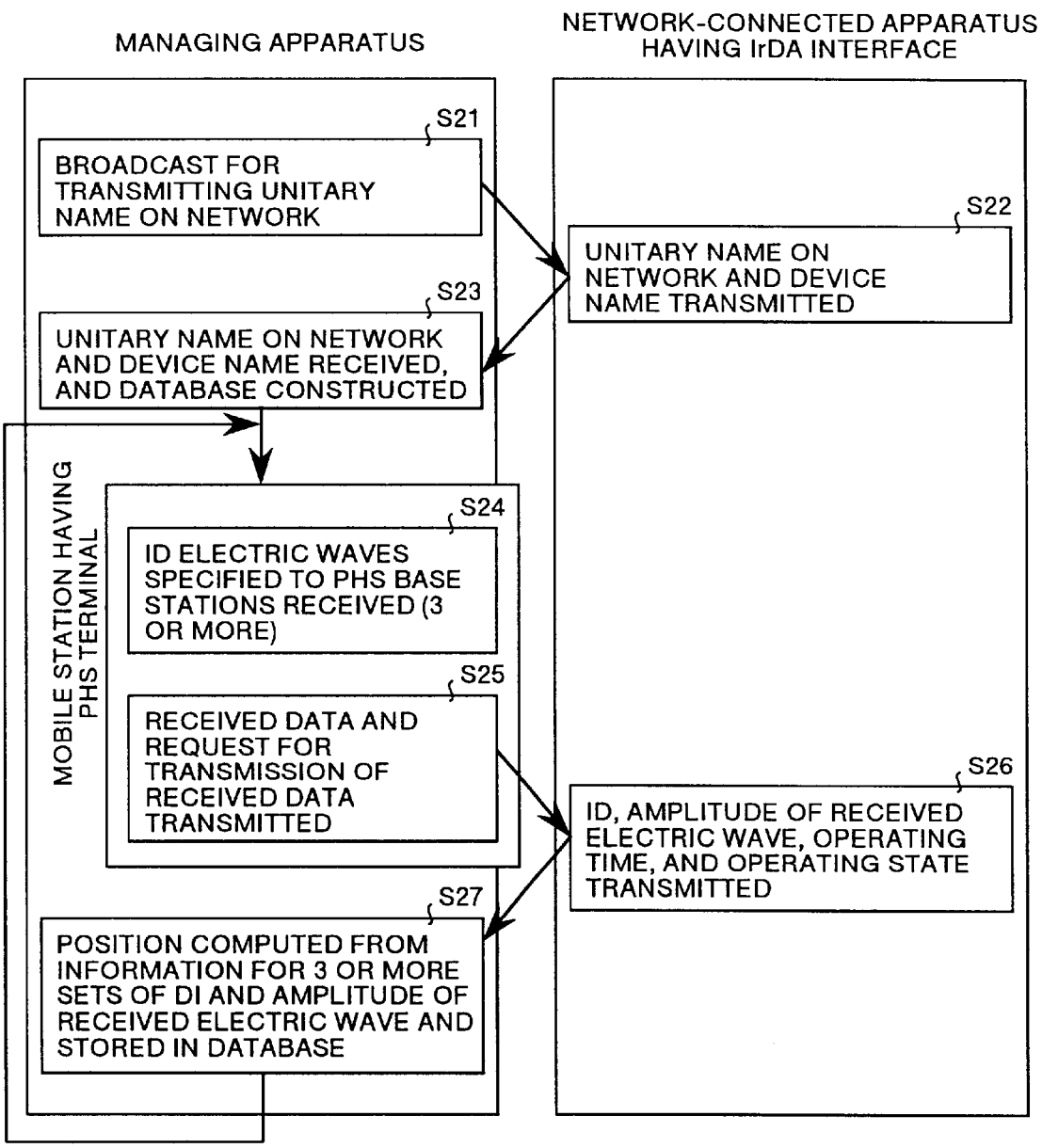
FIG. 12 is a flow chart showing the processing in Embodiment 3.

Description is made for actions of the network management facility having the configuration shown in FIG. 11 with reference to FIG. 12. The network managing method according to the present invention is divided into a first stage in which each network-connected apparatus 6 is recognized and the database 4 for each network-connected apparatus 6 is constructed, and a second stage in which positional information for each network-connected apparatus 6 is detected and the information is collected together with such data as an operating time of each network-connected apparatus 6.

First stage

The managing apparatus 1 transmits a request for transmission of information such as a unitary name of the network or a device name of each network-connected apparatus to all the network-connected apparatuses 6 connected to the network by using the broadcast function of the network (step S21).

Each network-connected apparatus 6 receives the request and transmits such data as the name on the network or device name thereof to the managing apparatus 1 (step S22).

The managing apparatus 1 having received the information from each network-connected apparatus 6 constructs the database 4 from the received information (step S23).

Second stage

A user as a network manager goes near each network-connected apparatus 6 in an arbitrary order carrying the PHS terminal 7 with him or her. Namely, the PHS terminal 7 is brought close to any of the network-connected apparatuses 6. Each of ID electric waves transmitted from at least PHS stations 3 respectively is received by the PHS terminal 7, and the received data is stored therein (step S24).

Then the user transmits received data including amplitudes of received electric waves and IDs as well as a request for transmission of the received data to the managing apparatus 1 from the PHS terminal 7 via the IrDA interfaces 71, 61 to the network-connected apparatus 6 (step S25).

The network-connected apparatus 6 receives and interprets the request for transmission of received data, and also transmits the data received from the PHS terminal 7 together with internal information for the apparatus such as an operating time and an operating state of the apparatus to the managing apparatus 1 (step S26).

The managing apparatus receives the data, and like in Embodiment 1 described above, identifies the position of the PHS terminal 7, namely a position of the network-connected apparatus 6 from the three or more pieces of received data. And the managing apparatus 1 stores the positional information for the network-connected apparatus 6 together with such received data as the received device name, an operating time and an operating stage of the apparatus in a field for the corresponding database record of the database 4 (step S27). Above operations are repeatedly executed for all the network-connected apparatuses 6.

Structure of data transacted over the network consists of, for instance as shown in FIG. 7, "unitary name on the network", "device name", "positional information" obtained from amplitudes of three electric waves A, B, and C, "operating time", "information for network connection" and "user-defined information". In this data structure, arbitrary data can be stored to any areas excluding those for "unitary name on the network" and "positional information".

The managing apparatus 1 transmits a request for transmission of information such as an operation time or an operating state at a specified cycle to each network-connected apparatus 6, and each network-connected apparatus 6 responds to the request for transmission.

With Embodiment 3 described above, the managing apparatus 1 constructs the database 4 for each network-connected apparatus 6, and a PHS terminal 7 is located near the network-connected apparatuses 6 which receives ID electric waves transmitted from at least three PHS base stations located at three different places, and transmits amplitudes of the received ID electric waves via the IrDA interfaces 71, 61 to the network-connected apparatus 6. The network-connected apparatus 6 transmits the IDs and amplitudes of received electric waves to the managing apparatus 1, while the managing apparatus 1 computes the position of each network-connected apparatus 6 based on the IDs and amplitudes as well as to positional information for the PHS base terminals 3 transmitting the electric waves, and stores the positional information in the database 4. Even if the network-connected apparatus 6 is moved, the destination of movement is automatically identified and reflected to the database 4, so that accurate information for movement of the network connected apparatus 6 is stored in the database 4. For this reason, information for the network configuration can be best managed by making use of the database 4.

Also with Embodiment 3 described above, when a trouble is generated in the network, it is possible to accurately know the present position and the actual position of the network-connected apparatus 6 in which the trouble has been generated, which makes it possible to reduce a time required until start of a work for restoring the network.

Further with Embodiment 3, it is not necessary to provided PHS terminals in all of the network-connected apparatuses 6, so that the network cost is lower as compared to that in Embodiment 1 shown in FIG. 5.

Also with Embodiment 3, the PHS base terminals are used, and if the PHS system has been introduced as a private network system, the existing PHS base stations can be utilized, and if the PHS base stations are introduced anew, the PHS base terminals can also advantageously be utilized as a private communication system.

Also with Embodiment 3, collection of positional information for the network-connected apparatus 6 is started after the PHS terminal 7 is brought closer to an arbitrary network-connected apparatus by the network manager, and in a case where the network-connected apparatus 6 has not been moved much, it is not required to frequently collect positional information for the network-connected apparatus 6, and this configuration is advantageous in that a work load to the network is reduced.

Figure 13:
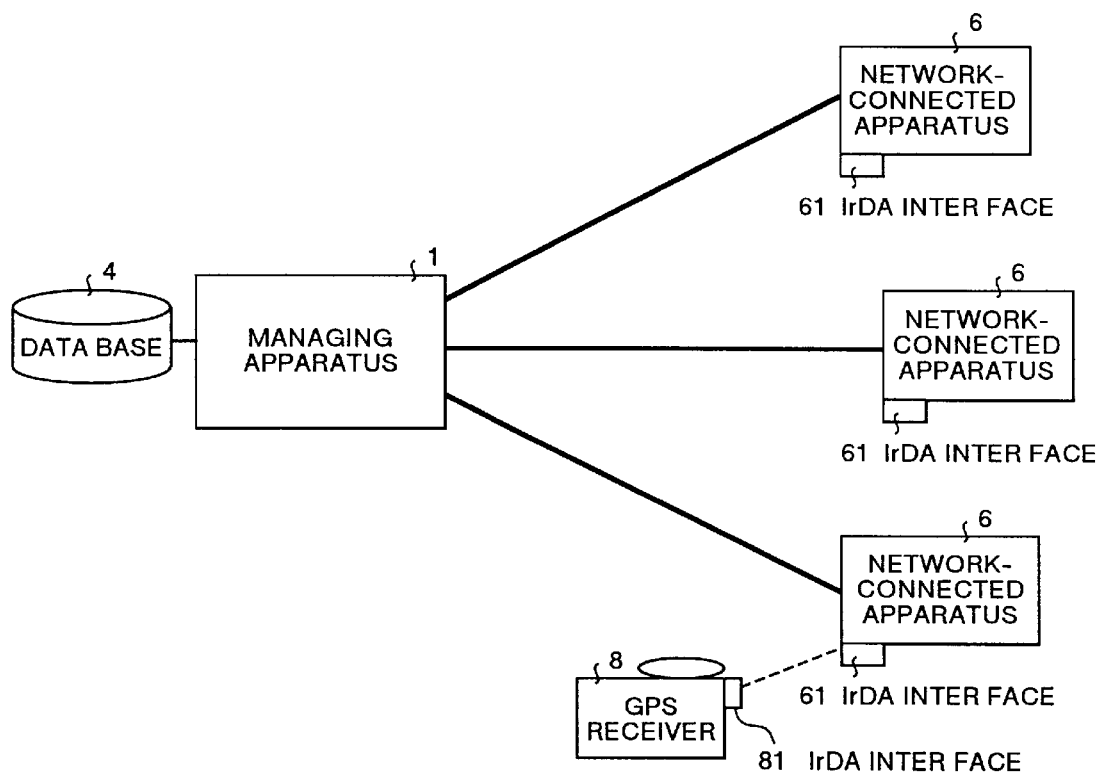
FIG. 13 is a block diagram showing Embodiment 4 of the present invention.
Figure 14:
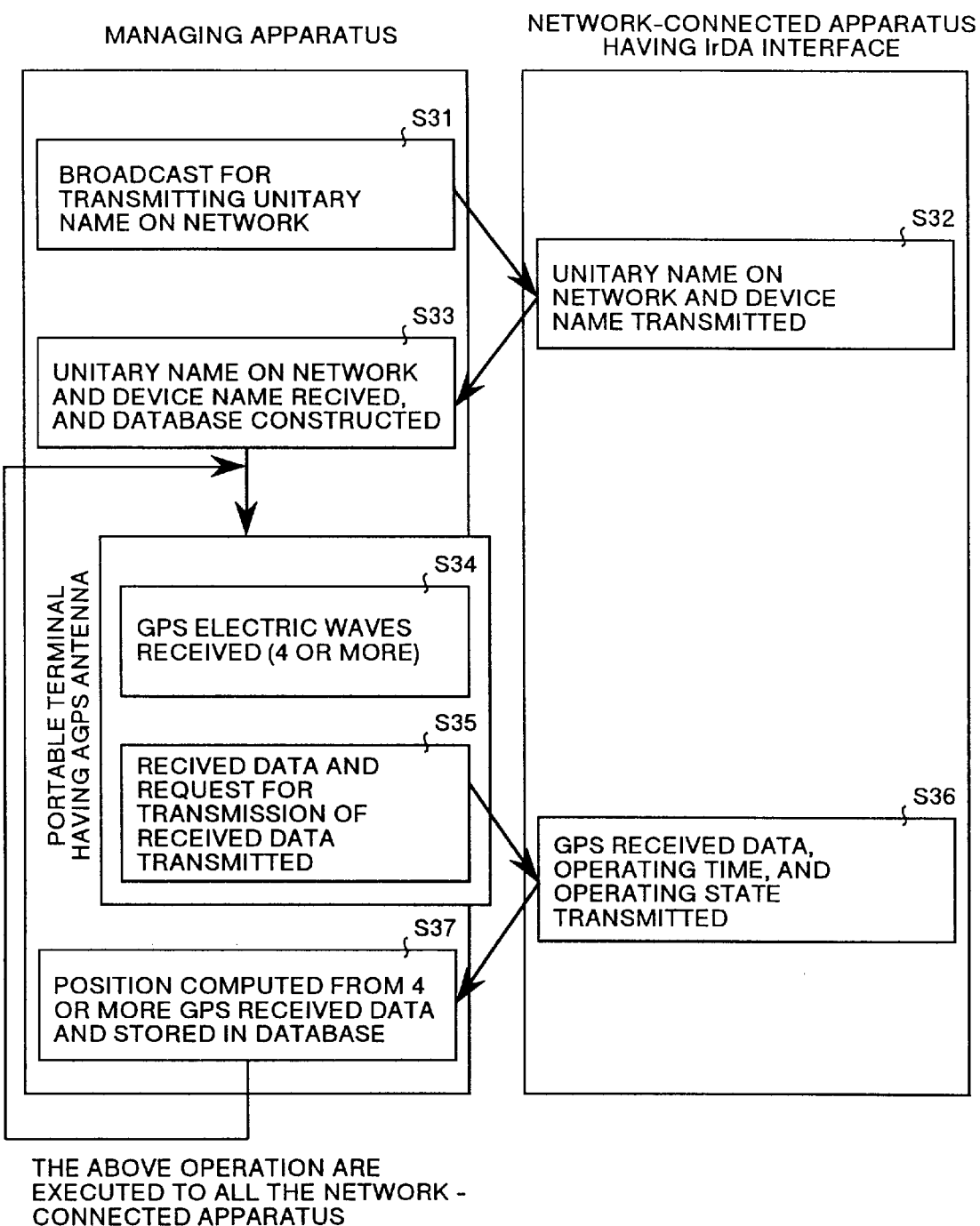
FIG. 14 is a flow chart showing the processing in Embodiment 4.

FIG. 13 is a block diagram showing the network management facility according to Embodiment 4 of the present invention. Difference between this network management facility and the one of Embodiment 1 shown in FIG. 5 is that each network-connected apparatus 6 connected to a network has, for instance, IrDA communication interface 61 as a communication unit instead of a PHS terminal and also the GPS receiver 8 as a portable terminal has the IrDA communication interface 81 as a communication unit, and that data transaction between the GPS receiver 8 and each network-connected apparatus 6 is made through the IrDA communication interfaces 81, 61 and also a position of each network-connected apparatus 6 is identified by using the GPS receiver 8. Same reference numerals are assigned to the same components as those in Embodiment 1 and detailed description is omitted herein.

The GPS receiver 8 receives electric wave for positional measurement transmitted from a communication satellite not shown herein, stores the received data, and transmits the received data via the IrDA interfaces 81, 61 to the network-connected apparatus 6.

When the GPS receiver 8 is located near the network-connected apparatus 6, it is possible to identify a position of the network-connected apparatus 6 by identifying a position of the GPS receiver 8, and for this reason the GPS receiver 8 has a function as the apparatus 300 for detecting positional information in FIG. 1. It should be noted that the GPS system is a known technology, so that description of the principle making it possible to identify a receiving site is not made herein.

The network-connected apparatus 6 transmits the data received from the GPS receiver 8 to the managing apparatus 1.

The managing apparatus 1 computes a position of the GPS receiver 8, namely a position of the network-connected apparatus 6 according to received electric waves for positional measurement transmitted from at least four communication satellites.

Description is made for actions of the network management facility having the configuration shown in FIG. 13. Also in the network managing method according to the present invention, operations are divided into a first stage in which each network-connected apparatus connected to the network is recognized and the database 4 for each network-connected apparatus 6 is constructed, and a second stage in which the information is collected together with such information as an operating time of each network-connected apparatus 6.

First stage

The managing apparatus 1 transmits a request for transmission of information such as a name on the network and a device name of each network-connected apparatus to all the network-connected apparatuses 6 connected to the network (step S31).

Each network-connected apparatus 6 receives the request, and transmits a name on the network or a device name thereof to the device configuration information managing apparatus 1 (step S32).

The managing apparatus 1 having received the information from each network-connected apparatus 6 constructs the database 4 from the received information (step S33).

Second stage

A user as a network manager goes near each network-connected apparatus 6 in an arbitrary order carrying the GPS receiver 8 with him or her. Namely, the GPS receive 8 is located at a position fully close to an arbitrary network-connected apparatus 6. In this state, the user makes the GPS receiver 8 receive GPS electric waves transmitted from at least four different communication satellites and has the received data stored (step S34).

Then the user transmits GPS received data and a request for transmission of the received data to the managing apparatus 1 from the GPS receiver 8 via the IrDA interfaces 81, 61 to the network-connected apparatus 6 (step S35).

The network-connected apparatus 6 receives and interprets a request for transmission of the received data, and transmits the received data together with internal information of the apparatus such as an operating time and an operating state of the apparatus to the managing apparatus 1 (step S36).

The managing apparatus 1 receives the data, and computes the position of the GPS receiver 8, namely the position of the network-connected apparatus 6 according to the received data. Then the managing apparatus 1 stores the positional information for the network-connected apparatus 6 together with such data as the received device name, an operating time and an operating state of the network-connected apparatus 6 in a field for the corresponding database record in the database 4 (step S37). Above operations are repeatedly executed to all the network-connected apparatuses 6.

Structure of data transacted over the network consists of, for instance as shown in FIG. 10, "unitary name on the network", "device name", "positional information" consisting of four pieces of received data A, B, C and D, "operating time", "information for network connection", and "user-defined information". In this data structure, any arbitrary data can be stored in any areas other than those for "a unitary name on the network" and "positional information".

The managing apparatus 1 transmits a request for transmission of information such as an operating time and an operating state at a specified cycle to each network-connected apparatus 6, and each network-connected apparatus 6 responds to the transmission request.

With Embodiment 4 described above, the managing apparatus 1 constructs the database 4 for each network-connected apparatus 6, and a GPS receiver 8 is located near the network-connected apparatus 6 which receives the GPS electric waves transmitted from at least four different communication satellites, and transmits the data via the IrDA interface 81, 61 to the network-connected apparatus 6. The network-connected apparatus 6 transmits the data to the managing apparatus 1, while the managing apparatus 1 computes the position of each network-connected apparatus 6 according to the received data, and stored the positional information in the database 4 for updating. Even if the network-connected apparatus 6 is moved, the destination of movement is automatically reflected and reflected to the database 4, so that movement of the network-connected apparatus 6 is accurately reflected to the database 4. For this reason, information for network configuration can be best managed by using the database 4.

With Embodiment 4, when a trouble is generated in the network, a position on the network and a device name of the network-connected apparatus 6 can accurately be known, so that a time required until start of a work for restoring the network can be reduced.

Further with Embodiment 4, it is not necessary to provide GPS receivers in all of the network-connected apparatuses 6, so that the network cost is lower as compared to that in Embodiment 2 shown in FIG. 8.

With Embodiment 4, a network manager starts collection of positional information for the network-connected apparatuses 6 by locating the GPS receiver 8 near an arbitrary network-connected apparatus 6 according to the necessity, so that, in a case where the network-connected apparatus 6 has not been moved much, it is not required to frequently collect positional information for the network-connected apparatus 6, which is effective for reducing a work load to the network.

It is needless to say that the present invention is not limited to the embodiments described above and various types of modification thereof are possible.

As described above, with the network management method according to the present invention, a managing apparatus constructs a database for each network-connected apparatus, and after construction of the database, each network-connected apparatus receives electric waves from at least three radio base stations provided at different places and transmits amplitudes of the received electric waves to the managing apparatus, while the managing apparatus computes the positions of each of the network-connected apparatus based on the amplitudes of electric waves received from each network-connected apparatus and the position of the radio base stations transmitting the electric waves and stores the position of the network-connected apparatus in the database, so that, when a network-connected apparatus is moved, the destination of movement is automatically reflected to the database without any manual operation, and movement of the network-connected apparatus is accurately and quickly reflected to the database to update the positional information stored therein. For this reason, information for configuration of the network can be put under best management by using the database. Also when a trouble is generated in the network, present position of the network and actual position of the network-connected apparatus in which the trouble has occurred can accurately be known, and a time required until start of a work for restoring the network can be reduced.

With the network managing method according to the present invention, a managing apparatus constructs a database for each network-connected apparatus, and after construction of the database, each network-connected apparatus receives electric waves transmitted from at least four different communication satellites and transmits the received data to the managing apparatus, while the managing apparatus computes the position of each network-connected apparatus based on the received data from each network-connected apparatus, and stores the position of the network-connected apparatus in the database, so that, when any network-connected apparatus is moved, information for destination of movement is automatically reflected to the database without requiring manual operation, so that movement of the network-connected apparatus can accurately and quickly be reflected to the database to update the positional information stored therein. For this reason, information for configuration of the network can be put under best management by using the database. Also when a trouble is generated in the network, present position of the network and actual position of the network-connected apparatus in which the trouble has been generated can accurately be known, and a time required until start of a work for restoring the network can be reduced.

With the network managing method according to the present invention, a managing apparatus constructs a database for each network-connected apparatus. After construction of the database, a mobile station is placed near the network-connected apparatus, and the mobile station receives electric waves from at least three radio base stations provided at different places from each other and transmits amplitudes of the received electric waves via a communication unit to the network-connected apparatus. The network-connected apparatus receives amplitudes of electric waves transmitted from the mobile station and transmits amplitudes of the received electric waves to the managing apparatus, while the managing apparatus computes positions of each of the network-connected apparatuses based on the amplitude of the electric waves transmitted from the network-connected apparatuses and the position of the radio base stations transmitting the electric waves and stores the position of the network-connected apparatus in the database. When a network-connected apparatus connected to the network is moved, the destination of movement is automatically identified and reflected to the database, so that movement of the network-connected apparatus is accurately reflected to the database. Also when a trouble is generated in the network, present position and an actual position of the network-connected apparatus in which the trouble has occurred can accurately be known, and a time required until start of a work for restoring the network can be reduced. Further, it is not necessary to provide receiving units in all of the network-connected apparatuses, so that the network cost can be reduced.

With the network managing method according to another aspect of the present invention, a managing apparatus constructs a database for each network-constructed apparatus. After construction of the database, a portable terminal is placed near the network-connected apparatus, and the portable terminal receives electric waves from at least four different communication satellites and also transmits the received data via a communication unit to the network-connected apparatus. The network-connected apparatus receives the data from a portable terminal and transmit the data to the managing apparatus, while the managing apparatus computes positions of the network-connected apparatuses based on the data transmitted by the network-connected apparatuses and stores the position of the network-connected apparatus in the database. When a network-connected apparatus connected to the network is moved, the destination of movement is automatically identified and reflected to the database, so that movement of the network-connected apparatus is accurately reflected to the database. Also when a trouble is generated in the network, present position and actual position of the network-connected apparatus in which the trouble has occurred can accurately be known, and a time required until start of a work for restoring the network can be reduced. Further, it is not necessary to provide receiving units in all of the network-connected apparatuses, so that the network cost can be reduced.

With the network management facility according to the present invention, each network-connected apparatuses receive electric waves transmitted from at least three radio base stations and transmits amplitudes of the received electric waves to the managing apparatus, while the managing apparatus constructs a database for each network-connected apparatus and computes positions of the network-connected apparatuses based on the amplitudes of electric waves transmitted from the network-connected apparatuses and positions of the radio base stations transmitting the electric waves and stores the position of the network-connected apparatus in a database, so that, when a network-connected apparatus is moved, information for destination of movement is automatically reflected to the database without requiring any manual operation, and movement of the network-connected apparatus can accurately and quickly be reflected to the database to update the positional information stored therein. Also information for configuration of the network can be put under best management by making use of the database. When a network-connected apparatus is moved, the destination of movement is automatically identified and reflected to the database, so that movement of the network-connected apparatus is accurately reflected to the database. Also when a trouble is generated in the network, present position and an actual position of the network-connected apparatus in which the trouble has occurred can accurately be known, and a time required until start of a work for restoring the network can be reduced.

With the network management facility according to the present invention, each network-connected apparatuses receive electric waves transmitted from at least four communications satellites and transmits the received data to the managing apparatus, while the managing apparatus constructs a database for each network-connected apparatuses, computes the position of each network-connected apparatus based on the received data transmitted from each network-connected apparatus, and stores the position of the network-connected apparatus in a database, so that, when a network-connected apparatus is moved, the destination of movement is automatically identified and reflected to the database, and for this reason movement of the network-connected apparatus is accurately reflected to the database. Also when a trouble is generated in the network, present position and an actual position of the network-connected apparatus in which the trouble has generated can accurately be known, and a time required until start of a work for restoring the network can be reduced.

With the network management facility according to the present invention, a mobile station placed near a network-connected apparatus receives electric waves transmitted from at least three radio base stations and transmits the amplitude of each received electric wave via a communication unit to the network-connected apparatus, while the network-connected apparatus receives the amplitude of each received electric wave transmitted from the mobile station and transmits the amplitude of the received electric wave to the managing apparatus, while the managing apparatus constructs a database for each network-connected apparatus, computes the position of each network-connected apparatus based on amplitude of each electric wave transmitted from each network-connected apparatus and the position of the radio base stations transmitting the electric waves, and stores the position of the network-connected apparatus in the database. When a network-connected apparatus is moved, the destination of movement is automatically updated to the database, so that accurate information for movement of the network-connected apparatus is accurately stored in the database. For this reason by using the database, information for configuration of the network can be put under best management. Also when a trouble is generated in the network, present position of the network and an actual position of the network-connected apparatus in which the trouble has occurred can accurately be known, and a time required until start of a work for restoring the network can be reduced. Further, it is not necessary to provide a receiving unit in each of all the network-connected apparatuses, which makes it possible to reduce the network cost.

With the network management facility according to the present invention, a portable terminal located at a position near the network-connected apparatus and receives electric waves transmitted from at least four communication satellites transmits the received data via a communication unit to the network-connected apparatus, while the network-connected apparatus transmits the data received from the portable terminal to the managing apparatus, and the managing apparatus constructs a database for each network-connected apparatus, computes the position of each network-connected apparatus according to the data received from each network-connected apparatus and stores the position of the network-connected apparatus in the database. When a network-connected apparatus is moved, the destination of movement is automatically identified and reflected to the database, so that accurate information for movement of the network-connected apparatus can be stored in the database. By using the database, information on configuration of the network can be put under best management. Also when a trouble is generated in the network, present position and an actual position of the network-connected apparatus in which the trouble has occurred can accurately be known, and a time required until start of a work for restoring the network can be reduced. Further, it is not necessary to provide a receiving unit in each of all the network-connected apparatuses, which makes it possible to reduce the network cost.

With the network-connected apparatus according to the present invention, electric waves transmitted from at least three radio base stations are received, and amplitudes of received electric waves are transmitted to a managing apparatus connected thereto through a network, so that the managing apparatus can identify the position of the network-connected apparatus based on the amplitude of received electric waves and position of the radio base stations transmitting the electric waves, and for this reason, when a network-connected apparatus is moved, the destination of movement is automatically identified by the managing apparatus, so that information for configuration of the network can be put under appropriate management. Also when a trouble is generated in the network, present position and an actual position of the network-connected apparatus in which the trouble has occurred can accurately be known, and a time required until start of a work for restoring the network can be reduced.

With the network-connected apparatus according to the present invention, electric waves transmitted from at least four communication satellites are received and the received data is transmitted to a managing apparatus connected thereto through a network, so that the managing apparatus can identify position of the network-connected apparatus from the received data, so that information for configuration of the network can be put under appropriate management. Also when a trouble is generated in the network, present position and an actual position of the network-connected apparatus in which the trouble has occurred can accurately be known, and a time required until start of a work for restoring the network can be reduced.

This application is based on Japanese patent application No. HEI 10-176369 filed in the Japanese Patent Office on Jun. 23, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A network managing method for management of a network to which at least one network-connected apparatus and a managing apparatus are connected, said network-connected apparatus having a receiver for receiving signals transmitted from a radio base station, said method comprising:

a step in which said managing apparatus constructs a database for said network-connected apparatus;

a step in which said network-connected apparatus receives signals transmitted from at least three radio base stations located at different places and transmits the amplitude of received signal to said managing apparatus; and a step in which said managing apparatus computes a position of said network-connected apparatus based on the amplitudes received from said network-connected apparatus and positions of said radio base stations and stores the position of said network-connected apparatus in said database.

2. The network managing method of claim 1 wherein said step in which said network-connected apparatus receives and transmits signals and said step in which said managing apparatus computes and stores said position of said network-connected apparatus is executed repeatedly.

3. A network managing method for management of a network to which at least one network-connected apparatus and a managing apparatus are connected, said network-connected apparatus having a receiver for receiving signals transmitted from a communication satellite, said method comprising:
a step in which said managing apparatus constructs a database for said network-connected apparatus;
a step in which said network-connected apparatus receives signals transmitted from at least four different communication satellites and transmits the data to said managing apparatus; and
a step in which said managing apparatus computes the position of said network-connected apparatus based on the data received from said network-connected apparatus and stores the position of said network-connected apparatus in said database,
wherein said step in which said network-connected apparatus receives signals and said step in which said managing apparatus computes and stores the position of said network-connected apparatus is executed repeatedly so that said database is updated continuously.

4. A network managing method for management of a network to which at least one network-connected apparatus and a managing apparatus are connected, said network-connected apparatus having a receiver for receiving signals transmitted from a mobile station, said mobile station having a communication unit for receiving signals transmitted by a radio base station, said method comprising:
a step in which said managing apparatus constructs a database for said network-connected apparatus;
a step in which said mobile station is brought close to said network-connected apparatus;
a step in which said mobile station receives signals transmitted from at least three radio base stations located at different places and transmits the amplitude of the signals to said network-connected apparatus using said communicating unit;
a step in which said network-connected apparatus receives the amplitudes from said mobile station and transmits them to said managing apparatus;
a step in which said managing apparatus computes position of said network-connected apparatus based on the amplitudes received from said network-connected apparatus and positions of said radio base stations and stores the position of said network-connected apparatus in said database.

5. The network managing method of claim 4 wherein said step in which said network-connected apparatus receives and transmits the amplitudes from said mobile station and said step in which said managing apparatus computes and stores position of said network-connected apparatus is executed repeatedly.

6. A network managing method for management of a network to which at least one network-connected apparatus and a managing apparatus are connected, said network-connected apparatus having a receiver for receiving signals transmitted from a portable terminal, said portable terminal having a communication unit for receiving signals transmitted by a communication satellite, said method comprising:
a step in which said managing apparatus constructs a database for said network-connected apparatus;
a step in which said portable terminal receives signals transmitted from at least four different communication satellites and transmits the data to said network-connected apparatus using said communication unit;
a step in which the network-connected apparatus receives the data from said portable terminal and transmits it to said managing apparatus; and
a step in which said managing apparatus computes the position of said network-connected apparatus based on the data received from said network-connected apparatus and stores the position of said network-connected apparatus in said database,
wherein said step in which said network-connected apparatus receives data and said step in which said managing apparatus computes and stores the position of said network-connected apparatus is executed repeatedly so that said database is updated continuously.

7. A network management facility comprising:
at least three radio base stations located at different positions and each transmitting a particular data;
at least one network-connected apparatus connected to a managing apparatus via the network; said network-connected apparatus having a receiver for receiving signals transmitted from said radio base stations; and
wherein said network-connected apparatus receives signals transmitted from said radio base stations and transmits the amplitude of the signals to said managing apparatus, and
said managing apparatus constructs a database for said network-connected apparatus, computes the position of said network-connected apparatus based on the amplitudes received from said network-connected apparatus and position of said radio base stations, and stores the position of said network-connected apparatus in said database.

8. A network management facility as claimed in claim 7 wherein said network-connected apparatus repeatedly receives and transmits said signals transmitted from said radio base stations and said managing apparatus repeatedly computes and stores the position of said network-connected apparatus.

9. A network management facility comprising:
at least four communication satellites each transmitting a particular data;
at least one network-connected apparatus connected to a managing apparatus via the network; said network-connected apparatus having a receiver for receiving signals transmitted from said communication satellites; and
wherein said network-connected apparatus receives signals transmitted from said communication satellites and transmits the data to said managing apparatus; and
said managing apparatus constructs a database for said network-connected apparatus, computes the position of said network-connected apparatus based on the data received from said network-connected apparatus, and stores the position of said network-connected apparatus in said databases,
wherein said step in which said network-connected apparatus receives signals and said step in which said managing apparatus computes and stores the position of said network-connected apparatus is executed repeatedly so that said database is updated continuously.

10. A network managing facility comprising:

at least three radio base stations located at different positions and each transmitting a particular data;

a mobile station having a receiver for receiving signals transmitted from said radio base stations;

at least one network-connected apparatus connected to a managing apparatus via the network; said network-connected apparatus capable of transacting a data between the mobile station using a communication unit; and wherein said mobile station receives signals transmitted from said radio base stations when said mobile station is brought closer to said network-connected apparatus and transmits the amplitude of received signals to said network-connected apparatus using said communication unit;

said network-connected apparatus receives the amplitudes from said mobile station and transmit them to said managing apparatus; and said managing apparatus constructs a database for said network-connected apparatus, computes the position of said network-connected apparatus based on the amplitudes received from said network-connected apparatus and position of said radio base stations, and stores the position of said network-connected apparatus in said data base.

11. A network managing facility as claimed in claim 10 wherein said network-connected apparatus repeatedly receives and transmits the amplitudes from said mobile station and said managing apparatus repeatedly computes and stores the position of said network-connected apparatus.

12. A network management facility comprising:

at least four communication satellites each transmitting a particular data;

a portable terminal having a receiver for receiving signals transmitted from said communication satellites;

at least one network-connected apparatus connected to a managing apparatus via the network; said network-connected apparatus capable transacting data between said portable terminal using a communication unit; and wherein said portable terminal receives signals from said communication satellites when said mobile terminal is brought close to the network-connected apparatus and transmits the data to said network-connected apparatus using said communication unit;

said network-connected apparatus transmits the data received from the portable terminal to said managing apparatus; and said managing apparatus constructs a database for said network-connected apparatus and computes the positions of said network-connected apparatus based on the data received from said network-connected apparatus, and stores the position of said network-connected apparatus in said database, wherein said step in which said portable terminal receives signals and said step in which said managing apparatus computes and stores the position of said network-connected apparatus is executed repeatedly so that said database is updated continuously.

13. A network-connected apparatus connected to a managing apparatus via a network, comprising:

a receiver for receiving signals transmitted from at least three radio base stations, said base stations located at different places and each transmitting a particular data;

wherein the amplitude of signals received by said receiver is transmitted to said managing apparatus, and said managing apparatus determines the position of said network-connected apparatus based on the amplitudes and position of said radio base stations.

14. A network-connected apparatus as claimed in claim 13 said receiver repeatedly receives said signals transmitted from the radio base stations said amplitude of signals received by said receiver is repeatedly transmitted to said managing apparatus.

15. A network-connected apparatus connected to a managing apparatus via a network, comprising:

a receiver for receiving signals transmitted from at least four communication satellites, each of said communication satellite transmits a particular data;

wherein the data of the signals received by said receiver is transmitted to said managing apparatus, and said managing apparatus determines the position of said network-connected apparatus based on the data received from said receiver, and wherein further said position is determined repeatedly.

\* \* \* \* \*